United States Patent [19]

Freeman et al.

[11] Patent Number: 5,556,938
[45] Date of Patent: Sep. 17, 1996

[54] ACID CATALYZED PROCESS FOR PREPARING AMINO ACID POLYMERS

[75] Inventors: Michael B. Freeman, Harleysville; James M. Lipovsky, Langhorne, both of Pa.; Yi H. Paik, Princeton, N.J.; Jan E. Shulman, Newtown; Graham Swift, Blue Bell, both of Pa.

[73] Assignee: Rohm and Haas Company, Philadelphia, Pa.

[21] Appl. No.: 466,867

[22] Filed: Jun. 6, 1995

Related U.S. Application Data

[60] Division of Ser. No. 213,648, Mar. 16, 1994, Pat. No. 5,457,176, which is a continuation-in-part of Ser. No. 125,052, Sep. 21, 1993, abandoned.

[51] Int. Cl.[6] ................................................. C08G 69/00
[52] U.S. Cl. ........................... 528/328; 528/363; 507/90; 526/62; 252/363.5
[58] Field of Search ................................. 528/328, 363; 526/62; 507/90; 252/363.5

[56] References Cited

U.S. PATENT DOCUMENTS

| | | |
|---|---|---|
| 3,052,655 | 9/1962 | Fox et al. ............................ 528/328 |
| 3,474,083 | 10/1969 | Shiga et al. ......................... 528/328 |
| 3,846,380 | 11/1974 | Fujimoto et al. .................... 528/328 |
| 3,923,751 | 12/1975 | Iwashita et al. ..................... 528/328 |
| 4,363,797 | 12/1982 | Jacquet et al. ....................... 528/328 |
| 4,590,260 | 11/1986 | Harada et al. ....................... 528/328 |
| 4,696,981 | 9/1987 | Harada et al. ....................... 528/328 |
| 4,839,461 | 6/1989 | Boehmke ............................. 528/328 |
| 5,057,597 | 10/1991 | Koskan ................................ 528/328 |
| 5,142,062 | 8/1992 | Knebel et al. ....................... 528/328 |
| 5,219,952 | 6/1993 | Koskan et al. ....................... 528/363 |
| 5,221,733 | 6/1993 | Koskan et al. ....................... 528/328 |
| 5,291,986 | 6/1993 | Cassata ................................ 528/328 |
| 5,319,145 | 6/1994 | Paik et al. ........................... 528/328 |
| 5,357,009 | 10/1994 | Shimizu et al. ....................... 526/62 |
| 5,371,177 | 12/1994 | Paik et al. ........................... 528/328 |
| 5,371,179 | 12/1994 | Paik et al. ........................... 528/328 |
| 5,380,817 | 1/1995 | Paik et al. ........................... 528/328 |

FOREIGN PATENT DOCUMENTS

| | | |
|---|---|---|
| 454126 | 10/1991 | European Pat. Off. . |
| 511037 | 10/1992 | European Pat. Off. . |
| 262665 | 12/1988 | Germany . |
| 44-9394 | 4/1969 | Japan . |
| 52-8873 | 3/1977 | Japan . |
| 3271265 | 12/1991 | Japan . |

OTHER PUBLICATIONS

Fox, S., "Thermal Polycondensation Of Alpha–Amino Acids", Analytical Methods Of Protein Chemistry, pp. 127–154, Permagon Press, Oxford (1966) The month of publication is not available.

Fox, S., et al., "Thermal Copolymerization Of Amino Acids In Thepresence Of Phosphoric Acid", Archives of Biochemistry And Biophysics, 86:281–285 (1960) The month of publication is not available.

Harada, K., "Polycondensation Of Thermal Precursors of Aspartic Acid", Journal Of Organic Chemistry 24:1662–1666 (1959) The month of publication is not available.

Kokufuta, E., et al., "Temperature Effect On the Molecular Weight And The Optical Purity Of Anhydropolyaspartic Acid Prepared By Thermal Polycondensation", Bul. Chem. Soc. Japan, 51 (5): 1555–15556 (1978) The month of publication is not available.

Neri, P., "Synthesis Of Alpha, Beta–Poly [(2–Hydroxyethyl)–DL–Aspartamide], A New Plasma Expander", Journal of Medicinal Chemistry 16(8):893897 (1973) The month of publication is not available.

Primary Examiner—Shelley A. Dodson
Assistant Examiner—P. Hampton-Hightower
Attorney, Agent, or Firm—Kimberly R. Hild

[57] ABSTRACT

The present invention relates to an acid catalyzed thermal polycondensation process for producing amino acid polymers. More specifically, amino acid polymers are produced by thermally condensing a mixture of one or more amino acids and optionally one or more polyfunctional monomers, using an acid catalyst, while maintaining an intimate admixture. Processing techniques useful for maintaining an intimate admixture include adding to the mixture one or more processing aids, using mechanical means, and combinations thereof. The amino acid polymers produced by this process are useful as cleaning and detergent additives; fertilizer and pesticide additives; personal care product additives; dispersants for inorganic particulates, aqueous emulsions, and drilling muds; and water treatment and oil production operation additives as corrosion and scale inhibitors.

3 Claims, No Drawings

5,556,938

ACID CATALYZED PROCESS FOR PREPARING AMINO ACID POLYMERS

This is a divisional application of U.S. application Ser. No. 08/213,648 filed on Mar. 16, 1994, now U.S. Pat. No. 5,457,176, a continuation-in-part application of U.S. application Ser. No. 8/125,052 filed on Sep. 21, 1993, now abandoned.

The present invention relates to a process for manufacturing amino acid polymers by thermally condensing a reaction mixture of one or more amino acids using one or more acid catalysts, while maintaining the mixture as an intimate admixture. More specifically, the intimate admixture is maintained by adding one or more processing aids to the reaction mixture, using mechanical means, or a combination thereof. This invention also relates to the use of the amino acid polymers prepared by this process as: cleaning and detergent additives; fertilizer and pesticide additives; personal care product additives; dispersants for inorganic particulates, aqueous emulsions, and drilling muds; and water treatment and oil production operation additives as corrosion and scale inhibitors.

BACKGROUND OF THE INVENTION

Poly(amino acids) such as poly(aspartic acid) are useful as cleaning and detergent additives; fertilizer and pesticide additives; personal care product additives; dispersants; and water treatment application and oil production operation additives. For example, European Application Number 454126 A, discloses the use of poly(amino acids) as builders in detergent formulations.

Poly(amino acids) have been synthesized by several different known methods. One known method for synthesizing poly(amino acids) consists of first forming poly(anhydroamino acid) by thermally condensing amino acids and then hydrolyzing the resulting poly(anhydroamino acid) to form poly(amino acid) as disclosed in U.S. Pat. No. 5,057,597. However, poly(aspartic acid) produced by the process of U.S. Pat. No. 5,057,597 is limited to a molecular weight less than 5,000 as measured by aqueous gel permeation chromatography (GPC) relative to a standard of 4500 molecular weight poly(acrylic acid).

Another thermal polycondensation reaction of amino acids is disclosed by Fox, et al., in a publication entitled "Thermal Polycondensation of Alpha-Amino Acids," *Analytical Methods of Protein Chemistry*, pp. 127–154, Permagon Press, Oxford 1966. Fox discloses a process where phosphoric acid, orthophosphoric acid, or polyphosphoric acid, used as a catalyst, is heated with one or more amino acids at 70° C. to about 210° C. to form poly(anhydroamino acid). Fox et al., reports that the phosphoric acid catalyst increases the reaction yield and molecular weight of the poly(anhydroamino acid).

There are several problems associated with the above mentioned processes for making poly(anhydroamino acid). The process to make poly(anhydroamino acid) using phosphoric acid and one or more amino acids presents difficult processing problems because the mixture of phosphoric acid and amino acid becomes a viscous molten paste upon heating. At the completion of the reaction, the solid product formed may consist of hard, large chunks of solid product. These hard, large chunks may be nonuniform in composition. For example the inner part of the hard, large chunks may contain unreacted amino acid due to less heat being transferred to the inner part. Additionally, the solid product may be caked to the walls of the reaction vessel. Because of these processing difficulties, the resulting solid product may need to be dissolved in solvent or pulverized to recover the poly(anhydroamino acid). The use of solvents creates additional problems, for example, solvent waste is generated which must be disposed of or recycled.

Consequently, it is an aim of the present invention to develop a process for manufacturing amino acid polymers using conventional processing equipment.

It is a further aim of the present invention to provide a continuous process for preparing amino acid polymers.

It is another aim of this invention to provide a relatively simple process for the manufacture of amino acid polymers which requires minimal or no solvent.

It is another aim of this invention to produce amino acid polymers having molecular weights up to 60,000.

It is another aim of this invention to produce amino acid polymers which can be used as: cleaning and detergent additives; fertilizer and pesticide additives; personal care product additives; dispersants for inorganic particulates, aqueous emulsions, and drilling muds; and water treatment and oil production operation additives as corrosion and scale inhibitors.

As used herein, "amino acid polymer" refers to polymeric materials which contain only succinimide moieties in the polymer chain, or contain succinimide and non-succinimide moieties in the polymer chain, and include polymers resulting from completely or partially hydrolyzing the amino acid polymer with an acid or base.

SUMMARY OF INVENTION

The present invention provides a process for manufacturing amino acid polymers comprising:

a) forming a reaction mixture of from about 15 to about 95 percent by weight amino acid, from about 3 to about 85 percent by weight of acid catalyst, and 0 to about 50 percent by weight of a polyfunctional monomer, wherein the weight percentages are based on the total weight of the starting reaction mixture;

b) heating said reaction mixture from about 110° C. to about 300° C., while maintaining said reaction mixture as an intimate admixture by adding one or more processing aids to the reaction mixture, using mechanical means, or a combination thereof;

c) removing water from said reaction mixture; and d) recovering amino acid polymer as a product.

The polymers produced by this process are useful as cleaning and detergent additives; fertilizer and pesticide additives; personal care product additives; dispersants for inorganic particulates, aqueous emulsions, and drilling muds; and water treatment and oil production operation additives as corrosion and scale inhibitors.

DETAILED DESCRIPTION OF THE INVENTION

The process of the present invention is a thermal polycondensation of one or more amino acids, using one or more acid catalysts, while maintaining the reaction mixture as an intimate admixture throughout the entire polycondensation reaction. The process consists of a) forming a homogeneous reaction mixture herein called the "starting reaction mixture" of at least one or more amino acids, one or more acid catalysts, and optionally one or more polyfunctional monomers, b) heating the reaction mixture while maintaining an intimate admixture, c) removing water from the reaction mixture, and d) recovering amino acid polymer. The amino acid polymer can be used in its non-hydrolyzed form, or it can used in the form resulting from partially or completely hydrolyzing the amino acid polymer with an acid or base.

By a "homogeneous reaction mixture" we mean that the components of the reaction mixture are evenly dispersed such that the concentration of each component is approximately the same throughout the entire reaction mixture, although each component may have a different concentration in the reaction mixture. We define an "intimate admixture" herein as a mixture where the components of the reaction mixture are evenly dispersed like the "homogeneous reaction mixture," and additionally, the reaction mixture is free from chunks or clumps of agglomerated reaction mixture.

The amino acids which can be used in the present invention include alpha and beta amino acids and may include for example aspartic acid, alanine, β-alanine, arginine, asparagine, 4-aminobutyric acid, cystine, glycine, glutamic acid, histidine, lysine, leucine, isoleucine, methionine, proline, serine, tryptophan, threonine, tyrosine, valine, and combinations thereof. Preferred amino acids are aspartic acid, glutamic acid, and combinations thereof.

Optionally, one or more polyfunctional monomers may be added to the reaction mixture. By "polyfunctional monomers" we mean herein compounds that contain two or more functional groups and will react in a thermal polycondensation reaction. In the reaction of the present invention, these optional polyfunctional monomers will copolymerize with the amino acid. The polyfunctional monomers useful in the process of the present invention include amic acids, diacids, polyacids, monoethylenically unsaturated anhydrides, diols, polyols, polyoxyalkylene diols, polyoxyalkylene polyols, diamines, polyamines, cyclic amide such as caprolactam, and cyclic ester such as caprolactone, and hydroxyalkylamines. The amount of polyfunctional monomers added to the starting reaction mixture may be from 0 weight percent to about 50 weight percent.

Acid catalysts used in the present invention are strong organic or inorganic acids that aid in increasing the molecular weight of the amino acid polymer. It is preferable that such acids have dissociation constants (pKa) of approximately less than 3. However, some acids with dissociation constants greater than 3 may be useful in increasing the molecular weight. Additionally, the acid catalysts useful in the present invention must not react with the amino acid in a way to terminate the chain growth of the amino acid polymer. For example, a monocarboxylic acid containing no other reactive functional groups to the amino acid is undesirable as an acid catalyst since it may react with the amino group of the amino acid and end the chain growth at one end of the amino acid polymer.

Acid catalysts useful in the present invention include for example inorganic and organic oxy acids such as oxy acids of phosphorus. Such phosphorus containing oxy acids include for example orthophosphoric acid, metaphosphoric acid, polyphosphoric acid, alkyl phosphonic acids, aryl phosphonic acids, phosphate esters or phosphite esters containing at least one acidic hydrogen, phosphorous acid, diphosphorous acid and hypophosphorous acid. Other inorganic and organic oxy acids useful as the acid catalyst include for example oxy acids containing nitrogen such as nitric acid and nitrous acid; oxy acids containing sulfur, such as sulfuric acid, sulfurous acid, alkyl sulfonic acids and aryl sulphonic acids; oxy acids containing a halogen such as chloric acid, chlorous acid, hypochlorous acid, bromic acid, bromous acid, hypobromous acid, and iodic acid; oxy acids containing molybdenum such as molybdic acid; and oxy acids containing tungsten. Binary acids may also be used as the acid catalyst. By "binary acids" we mean a compound containing one or more hydrogen atoms and one or more atoms of another type. Binary acids which may be used are for example hydrochloric acid, hydrogen sulfide, and hydrogen bromide. The acid catalyst may also include organic or inorganic salts which contain one or more acid hydrogens such as for example alkali metal and ammonium acids such as sodium bisulfate, potassium bisulfate, and ammonium bisulfite. The acid catalyst may also be what is known to those skilled in the art as a "super acid" such as fluorosulfuric acid and acids under the tradename of Nation® supplied by Dupont.

Preferred acid catalysts are oxy acids' containing phosphorus and sulfur, the organic or inorganic salts which contain one or more acid hydrogens, and combinations thereof.

The amount of acid catalyst added to the reaction mixture should be from about 3 weight percent to about 85 weight percent; preferably from about 5 weight percent to about 50 weight percent; and most preferably from about 10 weight percent to about 40 weight percent, where the weight percentages are based on the total weight of the starting reaction mixture of amino acid and acid catalyst.

Generally, increasing the amount of acid catalyst in the reaction mixture within the range of 3 weight percent to 85 weight percent will produce a polymer of higher molecular weight. Additionally, certain acid catalysts may be more effective in increasing the molecular weight of the amino acid polymer than others. For example, orthophosphoric acid will produce a polymer of higher molecular weight than when sodium bisulfate is used, when these acids are added to the starting reaction mixture at the same level by weight.

The starting reaction mixture is formed by one or more different pieces of blending equipment that is capable of mixing the components of the starting reaction mixture to form a homogeneous reaction mixture. Depending on the components desired for the starting reaction mixture, the blending equipment may be needed to mix different solids together, mix liquids into solids, or mix a paste or viscous solid. For example, a piece of blending equipment may be desired that is equipped with a spray nozzle which sprays the acid catalyst uniformly onto solid amino acid to form the homogeneous reaction mixture. Additionally, more than one piece of blending equipment may be desired. For example, one type of blending equipment may be used to mix solid components of the starting reaction mixture, and another type of blending equipment may be used to add liquid components of the starting reaction mixture to the solid components of the starting reaction mixture.

Another alternative is that one or more pieces of the blending equipment may be used in the step of heating the reaction mixture while maintaining an intimate admixture as described herein after.

Examples of equipment which can be used to form the starting reaction mixture include conventional batch and continuous mixers. Batch mixers may include for example, double planetary mixers, double arm kneading mixers, and stationary tank mixers such as gate mixers, shear bar mixers, and helical blade mixers. Batch mixers useful in the present invention may also include bulk blenders such as a ribbon blender, cone and screw mixers, pan muller mixers, and plough mixers which mechanically fluidize the particles by specially shaped agitator blades. Continuous mixers which may be used in the process of the present invention include for example single and twin screw extruders, trough and screw mixers, and pug mills.

After the reaction mixture is formed, the mixture is heated from about 110° C. to 300° C. and preferably from about 150° C. to 280° C. to condense the amino acids. The reaction is desirably carried out until greater than 80 weight percent of the starting amount of amino acid has been converted to the amino acid polymer. The time required to complete this conversion of amino acid may be from approximately 5 minutes to approximately 15 hours depending on such processing conditions as temperature, pressure, and type of equipment used to heat the reaction mixture. For example, as the reaction temperature increases, the time to convert 80 weight percent of the amino acid will decrease.

Generally, the molecular weight of the polymer can be controlled by adjusting reaction conditions such as the amount of acid catalyst in the starting reaction mixture, the reaction temperature, and the reaction time. For example, the molecular weight of the polymer will generally increase as the acid catalyst amount is increased, as the reaction temperature is increased, and as the reaction time is increased.

The thermal polycondensation reaction can be conducted at atmospheric pressure, subatmospheric pressure, or superatmospheric pressure. It is preferred that the reaction be conducted at subatmospheric pressure or atmospheric pressure. It is also preferable that the thermal polycondensation reaction be conducted in an atmosphere that is inert to the reaction mixture, for example, nitrogen, air, argon, and helium.

The equipment needed to heat the reaction mixture while maintaining an intimate admixture must have a means for removing water liberated from the condensation reaction, for example, a vent attached to a condenser for condensing the water. However, the equipment required for heating the reaction mixture will depend upon the processing techniques chosen for maintaining an intimate admixture. The processing techniques for maintaining an intimate admixture include adding one or more processing aids to the reaction mixture, using mechanical means, or combinations thereof.

The processing techniques are necessary to prevent the reaction mixture from forming large chunks of solid product and to prevent the reaction mixture from sticking to equipment walls. Without using processing techniques, as the starting reaction mixture containing the acid catalyst is heated, the reaction mixture generally will turn from a slightly wet and white powder to a viscous paste. Additionally, as the amount of acid catalyst in the starting reaction mixture is increased, the reaction mixture may become more molten and viscous in character. As the condensation reaction proceeds, powder will begin to agglomerate to form hard, large, chunks or clumps of solid product. These hard large chunks of solid product may be nonuniform in composition in that the inner layers of the chunks may contain more unreacted amino acid. Additionally, solid product may stick to the walls of the equipment. In comparison, if the acid catalyst was not added, the reaction mixture would remain a dry powder throughout the condensation reaction. Consequently, processing techniques are needed to prevent the reaction mixture from sticking to the walls of the reaction vessel and to prevent hard, large, chunks of solid product from forming.

Processing techniques used to maintain an intimate reaction admixture include adding one or more processing aids to the reaction mixture, using mechanical means, or combinations thereof. The processing techniques preferably produce particles in the reaction mixture that are less than about 5 centimeters in diameter and more preferably less than about 2 millimeters in diameter.

One or more processing aids may be added to the process of the present invention to make the starting reaction mixture more flowable and to prevent agglomeration of the reaction mixture. The processing aids may also act to increase heat-transfer, reduce the viscosity of the reaction mixture, and to enhance the removal of water liberated from the condensation. Suitable processing aids include refractory materials, for example zeolites, sulfates, sulfonates, carbonates, perchlorate, silicates, chlorides, bromides, alumina, clays, glass beads, polymeric granules, polymer produced by the process of this invention, and combinations thereof. Preferred processing aids include zeolite; silica gel; the amino acid polymer; alkylnaphthalenesulfonates; alkali metal, alkaline earth metal and ammonium salts of sulfates, silicates, and stearates; and combinations thereof.

The one or more processing aids may be added to the reaction mixture in an amount of 0 parts by weight processing aid to about a ratio of 10 parts processing aid per 1 part starting reaction mixture by weight. Preferably, the total amount of one or more processing aids is from about a ratio of 1 to 3 to about a ratio of 3 to 1 parts processing aid per parts starting reaction mixture by weight.

One or more processing aids may be added to the process at the same time the starting reaction mixture is formed. Alternatively, one or more processing aids may be added at any time during the condensation reaction or may be added continuously to the reaction mixture during the reaction. Preferably the processing aid is added at the same time the starting reaction mixture is formed.

If sufficient amount of processing aid is added to the starting reaction mixture, only minimal agitation is required during the heating of the reaction mixture to maintain an intimate admixture. Adequate minimal agitation could be for example an occasional motion of a slow moving agitator blade. For example, the starting reaction mixture could be formed in any one of the previously mentioned pieces of blending equipment with one or more processing aids. Then, the reaction mixture could be heated in a piece of equipment which heats the reaction mixture, minimally agitates the mixture, and has a means for removing water liberated from the condensation reaction, such as for example a direct or indirectly heated, continuous or batch dryer.

"Direct dryers" are defined herein as equipment where the drying occurs by contacting hot gases directly with the material to be dried. "Indirect dryers" are defined herein as drying equipment where heat for drying is transferred to the material to be dried through retaining walls and heated surfaces such as agitator blades and baffles. The dryer may also for example use both direct and indirect sources of heat to heat the reaction mixture, such as a dryer having heated walls and having a stream of hot gases flowing through it. Examples of batch or continuous dryers with minimal agitation which could be used to heat the reaction mixture with one or more processing aids include a rotary tray dryer, a rotary kiln dryer, a double cone shaped dryer, a V-shaped dryer, a pneumatic conveying dryer, a through circulation dryer, a tray and compartment dryer, a vibrating tray dryer, or a vacuum tray dryer where the shelves are heated.

If no processing aid is used, the equipment used to heat the reaction mixture must, in addition to having a means for heating the reaction mixture and removing water, be able to maintain an intimate admixture through mechanical means. Preferable equipment will be able to prevent agglomerates from forming such that the reaction mixture has particles that are less than about 5 centimeters in diameter.

This equipment used may be for example, blending equipment previously described herein for forming the starting reaction mixture, such as a conventional mixer that is equipped with a mechanism for heating the reaction mixture, agitating the reaction mixture, and removing water liberated from the condensation reaction. Additionally, the equipment used may be a dryer equipped with a means for agitating the reaction mixture and breaking-up or preventing the formation of agglomerated solid product. Examples of dryers useful in heating the reaction mixture without processing aids may be a direct or indirect dryer and may be a batch or continuous dryer. The dryer may also for example use both direct and indirect sources of heat. Dryers useful when no processing aid is present in the reaction mixture include for example fluid bed dryers, screw conveyor dryers, plough mixer dryers, and agitated pan dryers.

Of course, the equipment useful for heating the reaction mixture when no processing aid is present in the reaction mixture may be used when processing aid is present in the reaction mixture, and may additionally be used to form the starting reaction mixture. It is therefore possible to form the starting reaction mixture and heat the reaction mixture in one piece of equipment.

Alternatively, more than one piece of equipment may be used to complete the heating step. For example, a dryer providing a greater degree of agitation may be desired to heat the reaction mixture when it is a viscous paste, and another dryer with a lesser degree of agitation may be desired to complete the condensation reaction once the reaction mixture has turned to a powder.

An extensive source of useful blending equipment and dryers which may be used in the process of this invention may be found in the fifth edition of Chemical Engineers' Handbook by Perry & Chilton published by McGraw Hill, Inc., N.Y.

Other processing techniques which we have discovered to be useful in maintaining an intimate admixture and in preventing the formation of large agglomerates of solid product include, gradually increasing the temperature of the reaction mixture during the step of heating the reaction mixture and gradually adding the acid catalyst to the reaction mixture during the heating of the reaction mixture.

A preferred mode of this invention is to first form the starting reaction mixture in a conventional mixer in the presence of a processing aid, and then heating the reaction mixture in a dryer such as a rotary tray dryer.

Following the completion of the condensation reaction, the resulting amino acid polymer is recovered. A benefit of the process of the present invention is that the recovered amino acid polymer may be used in a variety of applications without having to remove the acid catalyst and the processing aid, and without having to post-treat the amino acid polymer. In fact, in some applications, the acid catalyst and the processing aid may add benefits to the performance of the amino acid polymer. For example, in detergent formulations, the acid catalyst and the processing aids used in the process of the present invention are many times added to detergent formulations to enhance performance.

The amino acid polymers may also be recovered in their completely or partially hydrolyzed forms. The amino acid polymers are hydrolyzed by techniques well known to those skilled in the art such as hydrolysis with one or more bases or one or more acids to form the corresponding water soluble salt or acid of the amino acid polymer. Preferably, the hydrolysis may be completely or partially carried out with any common alkali metal base, alkaline earth metal base, or low quaternary salt hydroxide, and combinations thereof to form the corresponding water soluble salt. The hydrolysis may be carried out in the same equipment used to perform the condensation reaction.

If desired, the recovered amino acid polymer may optionally be size reduced or delumped in conventional size reduction equipment such as granulators, pulverizers, air mills, jet mills, hammer mills, delumpers, and shredders.

The amino acid polymers produced by the process of the present invention are useful in a variety of applications. The amino acid polymers which are particularly useful are those having a weight average molecular weight (Mw) less than about 60,000, preferably from about 2,000 to about 30,000, and more preferably from about 4,000 to about 20,000 as measure by GPC relative to a 4,500 Mw poly(acrylic acid) standard.

For environmental reasons, the amino acid polymers produced by the process of this invention are preferred when they are more than 60 percent biodegradable, are more preferred when they are greater than 75 percent biodegradable, and most preferred when they are greater than 90 percent biodegradable. The biodegradability of the amino acid polymers is measured by a combination of test methods as described hereinafter in the "EXAMPLE" section.

The amino acid polymers are useful as additives in cleaning and detergent formulations such as for example hard surfaces; household, industrial and institutional laundry; and hand and automatic dishwashing. For example, the amino acid polymers may be used as builders, antiredeposition agents, soil removal agents, and dye transfer inhibition agents in cleaning and detergent formulations.

The amino acid polymers are also useful in water treatment applications including scale inhibition and corrosion control in systems such as cooling water, boiler water, desalination, sugar recovery, and reverse osmosis. The amino acid polymers are especially useful in oil production operations as inhibitors for barium sulfate and calcium sulfate precipitation in oil well drilling.

The amino acid polymers may also be used as dispersants for inorganic particulates such as pigments, kaolin clay, ceramics, calcium carbonate, zeolites, titanium dioxide; for aqueous emulsions such as latex paints and glazes; and for drilling muds. The amino acid polymers are also useful as dispersing agents in paper making.

The amino acid polymers can also be used as additives in fertilizers, and in pesticide formulations such as insecticide, fungicide, and herbicide formulations.

The polymers are also useful as additives in personal care products such as cosmetics, shampoo, toothpaste, and mouthwash.

The amino acid polymers are particularly useful as cleaning and detergent additives. Cleaning and detergent formulations containing the amino acid polymers may be in any of the usual physical forms, such as powders, beads, flakes, bars, tablets, noodles, liquids, pastes, slurries and the like. The cleaning and detergent formulations are prepared and utilized in the conventional manner and are usually based on surfactants, and optionally, on either precipitant or sequestrant builders.

Suitable surfactants are, for example, anionic surfactants, such as from $C_8$ to $C_{12}$ alkylbenzenesulfonates, from $C_{12}$ to $C_{16}$ alkanesulfonates, from $C_{12}$ to $C_{16}$ alkylsulfates, from $C_{12}$ to $C_{16}$ alkylsulfosuccinates and from $C_{12}$ to $C_{16}$ sulfated ethoxylated alkanols and nonionic surfactants such as from $C_6$ to $C_{12}$ alkylphenol ethoxylates, from $C_{12}$ to $C_{20}$ alkanol alkoxylates, and block copolymers of ethylene oxide and propylene oxide. Optionally, the end groups of polyalkylene oxides can be blocked, whereby the free OH groups of the polyalkylene oxides can be etherified, esterified, acetalized and/or aminated. Another modification consists of reacting the free OH groups of the polyalkylene oxides with isocyanates. The nonionic surfactants also include $C_4$ to $C_{18}$ alkyl glucosides as well as the alkoxylated products obtainable therefrom by alkoxylation, particularly those obtainable by reaction of alkyl glucosides with ethylene oxide. The surfactants usable in detergents can also have an amphoteric character and they can be soaps.

In general, the surfactants constitute from 2 to 50, preferably 5 to 45 percent by weight of the detergent or cleaning formulation. Liquid detergents usually contain as components liquid or even solid surfactants which are soluble or at least dispersible in the detergent or cleaning formulation. Surfactants suitable for this purpose are liquid polyalkylene oxides or polyalkoxylated compounds, products that can also be used in powdered detergents.

Examples of sequestrant builders contained in the cleaning and detergent formulations can include phosphates, specifically, orthophosphates, pyrophosphates and especially sodium tripolyphosphate. Further examples are the zeolites, sodium carbonate, polycarboxylic acids, nitrilotriacetic acid, citric acid, tartaric acid, the salts of the aforesaid acids and the monomeric, oligomeric or polymeric phosphonates.

The amounts of the individual substances used in the preparation of detergent formulations by weight based on the total weight of the detergent formulation are, for example, up to 85 weight percent sodium carbonate, up to 45 weight percent phosphates, up to 40 weight percent zeolites, up to 30 weight percent nitrilotriacetic acid and phosphonates and up to 30 weight percent polycarboxylic acids. In certain liquid detergent markets the use of builders is usually limited to citric acid and its salts or a combination of citrate and fatty acid soap, while in other markets liquid detergent compositions incorporate an intermediate level of soap, about 15 weight percent, or tripolyphosphate, about 20 weight percent, to assist overall cleaning efficacy.

Other common additives to detergent formulations are bleaching agents, used in an amount of up to 30 weight percent; corrosion inhibitors, such as silicates, used in an amount of up to 25 weight percent; dye transfer inhibiting agents, used in an amount up to 20 weight percent; and graying inhibitors used in an amount of up to 5 weight percent. Suitable bleaching agents are, for example, perborates, percarbonates or chlorine-generating substances, such as chloroisocyanurates. Suitable silicates used as corrosion inhibitors are, for example, sodium silicate, sodium disilicate and sodium metasilicate. Suitable dye transfer inhibiting agents are for example poly(vinyl pyrrolidone). Examples of graying inhibitors are carboxymethylcellulose, methylcellulose, hydroxypropylmethylcellulose and graft copolymers of vinyl acetate and polyalkylene oxides having a molecular weight of 1,000 to 15,000.

Other common detergent additives optionally used are optical brighteners, enzymes and perfumes. Powdered detergent formulations can also contain up to 50 weight percent of an inert diluent, such as sodium sulfate, sodium chloride, or sodium borate. The detergent formulations can be anhydrous or they can contain small amounts, for example up to 10 weight percent, of water. Liquid detergents can contain up to 80 weight percent water as an inert diluent.

One or more of the amino acid polymers can be added to cleaning and detergent formulations at levels where they provide the intended benefit. Generally, this level will be from about 0.5 to about 50 weight percent, preferably from about 1 to about 40 weight percent, based on the total weight of the formulation. For example, if the amino acid polymer is used as a builder in a detergent or cleaning formulation, the level in the formulation will be from about 5 to about 40 weight percent, based on the total weight of the formulation. In some cases, particularly when used as a soil removal agent and soil redeposition inhibitor, the amount of amino acid polymer actually used is preferably between about 1 and 10 weight percent, based on the cleaning and detergent formulation. Of particular importance is the use of the additives according to the invention in low-, phosphate detergents and cleaning agents, particularly those containing a precipitant builder such as sodium carbonate. The low-phosphate formulations contain up to a maximum of 25 weight percent of sodium tripolyphosphate or pyrophosphate. If desired, the amino acid polymers prepared according to the invention can be used in detergent formulations together with other copolymers of acrylic acid and maleic acid, with acrylic acid homopolymers or a combination thereof. The last-mentioned polymers are currently being used as soil redeposition inhibitors in detergent formulations. In addition to the aforementioned polymers, the copolymers of from $C_3$ to $C_8$ monocarboxylic and dicarboxylic acid or maleic anhydride and from $C_1$ to $C_4$ alkyl vinyl ethers are also suitable as soil redeposition inhibitors. The molecular weight of the homopolymers and copolymers is 1,000 to 100,000. If desired, these soil redeposition inhibitors can be used in detergents, together with the amino acid polymers in an amount of up to 20 weight percent based on the total formulation. The amino acid polymers can be added to detergent formulations in non-hydrolyzed form, or can be added in the form resulting from partial or complete hydrolysis with an acid or base.

Other preferred applications for the amino acid polymers produced by the process of this invention include water treatment. In water treatment applications the amino acid polymers may act as dispersants, and may also act as anti-nucleating agents where minor amounts of the antino acid polymers can serve as threshold inhibitors for crystal formation or scaling in applications such as for cooling water, boiler water, reverse osmosis, desalination, and sugar recovery. When used to inhibit crystal formation or scaling, the amino acid polymers are often combined with corrosion inhibitors such as inorganic or organic phosphates or phosphonates or metallic salts such as zinc compounds and the like. The polymers may also be used in oil production applications for inhibiting the precipitation of calcium sulfate and barium sulfate.

The amino acid polymers can be added directly to the aqueous system in an amount of 0.1 to 500 ppm by weight. However, during oil production operations, a higher amount of amino acid polymer may be desired to be added, such as an amount of 0.1 to 3000 ppm. The amino acid polymers may also be added as a concentrated aqueous composition wherein the amino acid polymer is present in the composition at a level of from 20 percent to 60 percent by weight.

EXAMPLES

Examples 2 to 9 are embodiments of the general process discussed herein above and are intended by way of illustration only and are not intended to limit the invention in any way. The weight average molecular weights (Mw) and the number average molecular weights (Mn) are measured by aqueous gel permeation chromatography (GPC) relative to a 4,500 Mw poly(acrylic acid) standard. $^1$H NMR spectroscopy confirmed the identity of the product as poly(anhydroaspartic acid) in examples 1–8.

Synthesis of Amino Acid Polymers

Comparative Example 1 - Synthesis of Poly(anhydroaspartic acid) without Acid Catalyst:

104 grams of L-aspartic acid was placed in a glass beaker. The glass beaker was placed in a muffle furnace at atmospheric pressure which had been preheated to 270° C. The L-aspartic acid reaction mixture was stirred with a spatula every 30 minutes. The reaction mixture turned from a white powder to a tan powder after 2 hours in the muffle furnace. After 8.5 hours at 270° C., the L-aspartic acid reaction mixture was removed from the muffle furnace. The reaction mixture was identified to be poly(anhydroaspartic acid) with a Mw of 4400 and an Mn of 3570.

Synthesis of Poly(anhydroaspartic acid) in a Muffle Furnace with an Acid Catalyst Example 2–5 weight percent level of 85 weight percent orthophosphoric acid:

950 grams of L-aspartic acid was mixed with 50 grams of 85 weight percent orthophosphoric acid in a stainless steel pan. The bed depth of the reaction mixture was about 1.5 inches. The reaction mixture was placed in a muffle furnace at atmospheric pressure that was preheated to 240° C. After 1 hour at 240° C., the slightly wet white powder became a pink powder containing yellow clumps. This reaction mixture was then removed from the muffle furnace and ground using a mortar and pestle to simulate mechanical means for maintaining an intimate admixture. After grinding, the reaction mixture was placed back in the muffle furnace. After a total of 6 hours at 240° C., the mostly pink powder became a tan powder. After a total of 10 hours at 240° C., the reaction mixture was removed from the muffle furnace. The process yielded 728 grams of tan powder. The tan powder was identified to be poly(anhydroaspartic acid) with a Mw of 5560 and an Mn of 4050.

Example 3–20 weight percent level of 85 weight percent orthophosphoric acid:

800 grams of L-aspartic acid was mixed with 200 grams of 85 weight percent orthophosphoric acid in a stainless steel pan to form a reaction mixture of a wet sticky white powder. The bed depth of the reaction mixture was about 1.5 inches. The reaction mixture was placed in a muffle furnace at atmospheric pressure that was preheated to 240° C. After 1 hour at 240° C., the wet sticky white powder turned to clumps of solid that were hard on the outside and sticky in the center. After one and a half hours, this reaction mixture was removed from the muffle furnace and ground using a mortar and pestle to simulate mechanical means for maintaining an intimate admixture. After grinding, the reaction mixture was placed back in the muffle furnace. After a total of 2.5 hours at 240° C., the reaction mixture became a tan powder. After a total of 6 hours at 240° C., the reaction mixture was removed from the muffle furnace. The process yielded 736 grams of a tan powder. The tan powder was identified to be poly(anhydroaspartic acid) with a Mw of 15,500 and a Mn of 8800.

Example 4–50 weight percent level of anhydrous sodium bisutfate:

150 grams of L-aspartic acid was mixed with 150 grams of anhydrous sodium bisulfate in a stainless steel pan to form a reaction mixture. The bed depth of the reaction mixture was about 1.0 inch. The stainless steel pan containing the reaction mixture was placed in a muffle furnace at atmospheric pressure which had been preheated to 240° C. The reaction mixture was stirred with a spatula every 30 minutes. After 30 minutes, the reaction mixture turned from a white powder to clumps which were tannish outside and white inside. After a total of 2 hours, the reaction mixture was a tan, hard cake. The reaction mixture was at this time removed from the muffle furnace and ground using a mortar and pestle to simulate mechanical means for maintaining an intimate admixture. After a total of 5 hours at 240° C., the reaction mixture, which was a tan powder, was removed from the muffle furnace. The reaction mixture was identified to be poly(anhydroaspartic acid) with a Mw of 7120 and an Mn of 5230.

Synthesis of Poly(anhydroaspartic acid) in a Slightly Agitated Vessel using an Acid Catalyst Example 5–10 weight percent level of Methanesulfonic acid:

A reaction mixture of 27 grams of L-aspartic acid and 3 grams of methanesulfonic acid was charged to a 100 milliliter glass reaction kettle equipped with a mechanical stirrer and an inlet for nitrogen. The flask was immersed in a hot oil bath preheated to 240° C. The agitator was then turned on, and a nitrogen sweep was started through the flask. After 15 minutes, the white powder became a yellow solid. The yellow solid was removed from the reaction kettle and ground to form a yellow powder using a mortar and pestle to simulate mechanical means for maintaining an intimate admixture. The yellow powder was then returned to the reaction kettle. After a total of 1 hour at 240° C., the reaction mixture turned to a yellow solid and was again ground to form a yellow powder using a mortar and pestle. The yellow powder was then returned to the reaction kettle. After a total of 5 hours at 240° C., the reaction mixture was a yellow powder and was allowed to cool to room temperature. The reaction mixture was identified to be poly(anhydroaspartic acid) with a Mw of 6240.

Synthesis of Poly(anhydroaspartic acid) with an Acid Catalyst and Processing Aid Example 6—Sodium Sulfate Processing Aid;

(1 part processing aid: 2.9 parts starting reaction mixture )

31.3 grams of L-aspartic acid was mixed with 1.25 grams of anhydrous sodium bisulfate, 4.7 grams of 85 weight percent orthophosphoric acid, and 12.8 grams of anhydrous sodium sulfate in a 250 ml glass beaker to form a reaction mixture. The glass beaker containing the reaction mixture was placed in a muffle furnace at atmospheric pressure which had been preheated to 240° C. The reaction mixture was stirred with a spatula every 30 minutes. After 2 hours, the reaction mixture changed from a wet white powder to a yellow dry granular powder. It was not necessary to grind the mixture. After 5 hours at 240° C., the reaction mixture was removed from the muffle furnace. The reaction mixture was a tan, dry grantLiar powder and was identified to be poly(anhydroaspartic acid) with a Mw of 10,700 and an Mn of 6780.

Example 7—Forming a Reaction Mixture with Sodium Sulfate Processing Aid;

(1 part processing aid: 1.5 parts starting reaction mixture)

A Henchel Model FM-50 Blender was used to form the reaction mixture. The Henchel blender used had an inner diameter of 15 inches and height of 15 inches, had three 14 inch hydrofoil paddles and one 2 inch by 5.5 inch baffle, and was equipped with a jacket. The blender also contained a 3 inch diameter port on the top of the blender. The procedure for forming the reaction mixture was as follows:

a) To the Henchel blender was charged 5 kg of L-aspartic acid, 4 kg of sodium skilfate, and 250 grams of sodium bisulfate to form a reaction mixture.

b) With city water going through the jacket for cooling, the blender was started at 1000 rpm to blend the reaction mixture. After about 2 minutes, the blender was turned off due to the reaction mixture reaching 50° C.

c) After the reaction mixture cooled to 38° C. (about 4 to 6 minutes to cool), the blender was started up at 1000 rpm and approximately 15 to 20 grams of an 85 weight percent solution of orthophosphoric acid was sprayed into the blender from the top port of the blender using a spray bottle. After about 1 minute, the reaction mixture reached 50° C., and the blender was turned off to allow the reaction mixture to cool to 38° C.

d) Increments of the orthophosphoric acid were added as in step (c) until a total of 750 grams of 85 weight percent orthophosphoric acid was added.

e) After all the orthophosphoric acid was added, the reaction mixture was removed from the blender.

Example 8—Thermal Polycondensation in the Presence of Processing Aid;

(1 part processing aid: 1.5 parts starting reaction mixture)

A 2-tray dryer having a movably positioned top tray and a movably positioned bottom tray wherein the vertical positions of the two trays could be switched, was pre-heated to provide an internal temperature of 240° C. and a continuous stream of heated air flowing at a rate of 300 cubic feet/minute was passed through the dryer. 1000 grams of the reaction mixture from Example 6 was introduced into the top tray of the dryer, and the bed depth was adjusted to 1.5 inches. The material in top tray was transferred to the lower tray every six minutes, then the vertical positions of the trays were switched. The total residence time was 2 hours. Analysis by $^1$H NMR spectroscopy indicated that greater than 95 percent by weight of the aspartic acid was converted to poly(anhydroaspartic acid). The poly(anhydroaspartic acid) was recovered as a tan, free-flowing powder and had a Mw of 9600.

Hydrolysis of Amino Acid Polymers

Example 9—Hydrolysis of Poly(anhydroaspartic acid)

To a one liter, four-neck flask equipped with a mechanical stirrer, thermo-couple, condenser, pH probe, and an inlet for addition of base feed, was charged 136 grams of deionized water. 25 grams of poly(anhydroaspartic acid) from Example 6 was then charged to the flask to form a mixture. The mixture was then heated to 90° C. A drop-wise feed of 50 weight percent solution of sodium hydroxide was then started. The feed was controlled using a Chem-Cadet® (manufactured by Cole Palmer Instrument Inc, located in Chicago, Ill.) such that the feed would stop when the mixture reached a pH of 10.8. A total of 16 grams of the 50 weight percent sodium hydroxide solution was charged to reach a stable pH of 10.8. After the sodium hydroxide was charged, the mixture was held for 30 minutes at 90° C. After the 30 minute hold, the mixture was cooled to room temperature. The mixture was then lyophilized until a dried sample was obtained of poly(aspartic acid).

Examples 2 to 8 in comparison to Comparative Example 1 demonstrate that the acid catalyst increases the molecular weight of the amino acid polymer produced by the process of the present invention. Examples 2 and 3 demonstrate that as the amount of acid catalyst is increased in the starting reaction mixture, the molecular weight of the amino acid polymer increases. Examples 2 and 3 also demonstrate that the reaction mixture becomes more sticky and difficult to process as the acid catalyst in the reaction mixture is increased; however, mechanical means may be used to break up chunks of the reaction mixture to maintain an intimate admixture. Examples 3, 4, and 5 demonstrate that various types of acid catalyst are useful in the process of the present invention.

Examples 6 and 8 demonstrate that when a processing aid is added to the process of the present invention, the reaction mixture remains more powdery and flowable, and is less likely to form agglomerates when heated. As a result, mechanical means for maintaining the reaction mixture as an intimate admixture while heating is not necessary.

Biodegradation of Amino Acid Polymers

The most preferred amino acid polymers produced by the process of the present invention are more than 90 percent biodegradable. The biodegradability of the amino acid polymers shown in Table I were measured by a combination of test methods used in the following order. First, the amino acid polymers were acclimated using the SCAS Test Method to generate an aqueous extract as described in a publication by R. D. Swisher entitled "Surfactant Biodegradation," *Surfactant Science Series*, Volume 18, Second Edition, published by Marcel Dekker Inc., N.Y. and Basel, 1987, page 363, herein called "Swisher publication." By "acclimated", we mean that the amino acid polymer was continuously fed into a sewage sludge and an aqueous effluent of the sewage sludge was collected to obtain the aqueous extract according to the SCAS Test Method. The aqueous extract from the SCAS Test Method was then diluted by taking 1 ml of the aqueous extract and diluting the extract in 1000 ml of water to form a diluted aqueous extract. To the diluted aqueous extract was added the amino acid polymer to produce a polymer concentration in the dilute aqueous extract of 20 milligrams amino acid polymer per liter. The diluted aqueous extract containing the amino acid polymer was measured for percent carbon dioxide ($CO_2$) evolution and for percent removal of dissolved organic carbon (DOC) to account for all carbon in the amino acid polymer. The percent $CO_2$ evolution of the amino acid polymers was measured using the Modified Sturm, OECD 301B Test. The modified Sturm, OECD 301B Test may be found in the Swisher publication on page 312, or can be found in a publication entitled *OECD Guidelines for Testing of Chemicals*, First Addendum, May 1983 published by the Organization for Economic Corporation and Development, ISPN 92-64-221-4. The percent removal of DOC of the amino acid polymers is measured by a conventional carbon analyzer as described in the Swisher publication on page 117.

The "Day" column in Table I indicates the number of days after the $CO_2$ evolution and DOC removal tests were started that the $CO_2$ evolution and DOC removal were measured on the diluted aqueous extract. The DOC removal value is a measurement of biodegradability such that a DOC removal of 100 percent indicates that the polymer is 100 percent biodegradable. The DOC value therefore includes the amount of carbon that is emitted as $CO_2$. Consequently, the percent $CO_2$ evolution of the diluted aqueous extract is only an indication of biodegradability and gives an indication of the rate at which biodegradation is taking place.

In Table I below, Comparative Example 10 was prepared by heating L-aspartic acid in a rotary tray dryer for 6 hours at 240° C. Example 11 in Table I was prepared by the procedure in Example 2 except that the reaction mixture of Example 11 was formed according to the composition indicated in Table I, and the reaction mixture of Example 11 was heated for 6 hours instead of 5 hours. Example 12 was prepared by the procedure in Example 4, and Example 13 was prepared by the procedure in Example 5, except that the reaction mixtures of Examples 12 and 13 were formed according to the compositions indicated in Table I. All examples and comparative examples in Table I were hydrolyzed according to the procedure in Example 9.

TABLE I

Biodegration versus the Presence of an Acid Catalyst

| Test Sample | Reaction Mixture Composition | Mw | Day | % $CO_2$ Evolution | % DOC Removal |
| --- | --- | --- | --- | --- | --- |
| Comparative Example 10 | 100 Asp/0 acid catalyst | 4200 | 92 | 78.8 | 64.6 |
| Example 11 | 80 Asp/20 $H_3PO_4$ | 18,400 | 47 | 91.7 | 100.0 |
| Example 12 | 70 Asp/20 $NaHSO_4$/ 10 $H_3PO_4$ | 15,300 | 29 | 85.1 | 106.0 |
| Example 13 | 50 Asp/10 $H_3PO_4$/40 $Na_2SO_4$ | 10,900 | 29 | 82.3 | 93.3 |

Key for Table I:
Asp % by weight L-aspartic acid
$H_3PO_4$ % by weight 85 weight percent orthophosphoric acid
$NaHSO_4$ % by weight sodium bisulfate
$Na_2SO_4$ % by weight sodium sulfate Table 1 indicates that heating a reaction mixture of L-aspartic acid with no acid catalyst to form a polymer as in Comparative Example 10 does not produce a 90 percent or greater biodegradable polymer. However, polymers prepared according to the process of the present invention can be greater than 90% biodegradable. Example 13 indicates that adding a processing aid to the reaction mixture does not significantly affect the biodegradability of the amino acid polymer.

Processability of Amino Acid Polymers

Table II below shows the processability of the amino acid polymers produced by the process of the present invention in comparison to polymers prepared from a reaction mixture of amino acid and acid catalyst without using processing aids or mechanical means for maintaining an intimate admixture. All the examples in Table II, including Comparative Example 14 are expected to be more than 90% biodegradable as supported by the data in Table I.

Comparative Example 14 in Table II was prepared by mixing 25 grams of L-aspartic acid and 12.5 grams of 85 weight percent orthophosphoric acid in a metal pan to form a reaction mixture. The reaction mixture was spread evenly in the metal pan to form a ⅛ inch bed depth of reaction mixture. The reaction mixture was placed in a muffle furnace at 240° C. for 3 hours.

In Table II, in the column labeled "Final Product", the process of Comparative Example 14 produced a puffy hard film which stuck to the metal pan. The process of Examples 11 and 13 produced a tan powder. The difference in final product form was due to the processing techniques used in Examples 11 and 13. In Example 11 mechanical means was used to maintain an intimate admixture, and in Example 13 a processing aid was used to maintain an intimate admixture. In Comparative Example 14, no processing techniques were used and an undesirable puffy hard film was produced.

TABLE II

Processability

| Example | Reaction Mixture Composition | Mw | Final Product |
| --- | --- | --- | --- |
| Comparative Example 14 | 67 Asp/33 $H_3PO_4$ | 23,600 | Puffy Hard Film |
| Example 11 | 80 Asp/20 $H_3PO_4$ | 18,400 | Tan Powder |
| Example 13 | 50 Asp/10 $H_3PO_4$/40 $Na_2SO4$ | 10,900 | Tan Powder |

Key for Table II:
Asp % by weight L-aspartic acid
$H_3PO_4$ % by weight 85 percent orthophosphoric acid
$NaHSO_4$ % by weight sodium bisulfate
$Na_2SO4$ % by weight sodium sulfate Soil Removal and Anti-Redeposition Performance Evaluation for Laundry The efficacy of the amino acid polymers produced by the process of the present invention for clay soil removal and anti-redeposition was evaluated by washing soiled cotton and terry cotton blended fabrics in the detergent formulation shown in Table III.

Cotton cloth #405 was purchased from Test Fabrics, Inc. (Middlesex, N.J.) and cut to a specified size (3½×4½"). The cloths were then soiled by applying from 0.9 to 1.1 grams of a 25 percent clay slurry (in water) using a China bristle brust (#10). The soil was "painted" onto the cloth inside a 2" diameter circle and allowed to air dry overnight prior to laundering. The clay used to soil the cloths was a reddish-brown particulate clay.

The detergent compositions were tested in a Terg-o-Tometer at the following conditions; 40° C., 100 rpm, 100 ppm hardness (50 percent city tap water/50 percent deionized water), 12 minute wash with one 3 minute rinse, 1300 ppm detergent and 5 cloths per pot (3 of them soiled). The wash water was pre-heated, the fabric swatches were added and then dissolved detergent (2.6 grams of a 25 percent slurry in 100 milliliters water) was added. Following the wash period the swatches were wrung, and following the rinse cycle the swatches were wrung again and then air dried. Swatches washed in a detergent containing no polymer were always run as a control.

Reflectance was measured using a Pacific Scientific Colorimeter (Colorgard System 1000) and the data recorded using the L,a,b color scale. Detergency values (E), a measure of soil removal, and whiteness index (W.I.), a measure of anti-redeposition, are calculated as:

$$E=((L_s-L)^2+(a_s-a)^2+(b_s-b)^2)^{0.5}$$

$$W.I.=(L/100)*(L-(5.715*b))$$

where $L_s$, $a_s$, and $b_s$ are the reflectivity reading for the soiled swatches and L,a,b are the reflectivity readings for the washed swatches. Each amino acid polymer was evaluated in three separate washing experiments. The detergent composition and levels of the components in parts by weight ("pbw") are shown in Table III. This composition was used for the above described performance evaluation and the results of the detergent performance evaluation are listed in Table IV. The reflectance of the soiled cloths was measured before laundering so that only cloths of the same reflectance were used in a test. Reflectance was then measured after laundering to evaluate the efficacy of the amino acid polymer in the detergent. The values reported in Table III are the average of the change in detergency and whiteness index of three cloths relative to the control cloths laundered in detergent not containing polymer.

TABLE III

WASH CONDITIONS

| APPARATUS - | Terg-o-meter washing machine |
|---|---|
| AGITATION - | 100 revolutions per minute |
| TEMPERATURE - | 40° C. |
| WATER HARDNESS - | 100 part per million ("ppm") |
| WASH CYCLE - | 12 minutes |
| RINSE CYCLE - | 3 minutes |
| WATER LEVEL - | 1 liter |
| DETERGENT DOSAGE - | 1300 ppm |
| BALLAST - | 5 cloths per load (3 soild/2 unsoiled) |

Detergent Composition Used to Evaluate Amino Acid Polymer for Soil Removal and Anti-Redeposition

| Detergent Component | pbw |
|---|---|
| sodium carbonate | 22.0 |
| zeolite A | 16.0 |
| sodium silicate | 2.7 |
| LAS | 8.3 |
| lauryl sulfate | 8.3 |
| sodium sulfate | 34.0 |
| polymer | as shown in Table IV |

TABLE IV

Performance of Amino Acid Polymers in Laundry

| Example | Composition | Mw | pbw | ΔE | ΔW.I. |
|---|---|---|---|---|---|
| Comparative Example 15 | No Polymer | — | — | 0.0 | 0.0 |
| Comparative Example 1 | 100 Asp | 4400 | 3 | 1.9 | 7.5 |
| Example 16 | 90 Asp/10 H$_3$PO$_4$ | 9160 | 3 | 2.4 | 8.3 |
| Example 17 | 70 Asp/20 NaHSO$_4$/ 10 H$_3$PO$_4$ | 15,300 | 3 | 2.9 | 6.3 |
| Example 18 | 70 Asp/20 NaHSO$_4$/ 10 H$_3$PO$_4$ (hydrolyzed) | 15,300 | 4.2 | 2.6 | 7.2 |
| Example 19 | 50 Asp/10 H$_3$PO$_4$/40 Na$_2$SO4 | 10,900 | 3 | 3.0 | 6.7 |
| Example 20 | 50 Asp/10 H$_3$PO$_4$/40 Na$_2$SO4 (hydrolyzed) | 10,900 | 4.2 | 2.6 | 10.2 |
| Example 21 | 60 Asp/10 H$_3$PO$_4$/30 NaHSO$_4$ | 19,800 | 3 | 3.2 | 8.2 |
| Example 22 | 60 Asp/10 H$_3$PO$_4$/30 NaHSO$_4$ (hydrolyzerd) | 19,800 | 4.2 | 2.25 | 9.4 |
| Example 23 | 90 Asp/5 H$_3$PO$_4$/5 NaHSO$_4$ | 6100 | 3 | 2.3 | 6.6 |
| Example 24 | 90 Asp/5 H$_3$PO$_4$/5 NaHSO$_4$ (hydrolyzed) | 6100 | 4.2 | 1.6 | 8.8 |

Key for Table IV
Asp % by weight L-aspartic acid
H$_3$PO$_4$ % by weight 85 weight percent orthophosphoric acid
NaHSO$_4$ % by weight sodium bisulfate
Na$_2$SO4 % by weight sodium sulufate Example 16 in Table IV was prepared by the procedure in Example 4 except that the reaction mixture was formed according to the reaction mixture composition indicated in Table IV, and the total reaction time was 6 hours instead of 5 hours. Examples 17 to 18 and 21 to 24 in Table IV were also prepared by the procedure in Example 4, and Examples 19 and 20 were prepared by the procedure in Example 6, except that the reaction mixtures for Examples 17 to 24 were formed according to the reaction mixture compositions indicated in Table IV. Examples 18, 20, 22, and 24 were hydrolyzed according to the procedure described in Example 9.

The change in detergency (ΔE) values and whiteness index (ΔW.I.) values indicate that the amino acid polymers produced by the process of the present invention are effective as additives for cleaning and detergent formulations.

Performance of Amino Acid Polymers in Automatic Dishwashers

Test Method

The dishwashing tests were performed using a modified version of A.S.T.M. method D 3556–85, Standard Test Method for Deposition on Glassware During Mechanical Dishwashing. This test method covers a procedure for measuring performance of household automatic dishwashing detergents in terms of the buildup of spots and film on glassware. Glass tumblers were given five cycles in a dishwasher, in the presence of food soils, and the levels of spotting and filming allowed by the detergents under test were compared visually.

A Kenmore dishwashing machine was used to perform the washing tests. The bottom rack of the dishwasher was randomly loaded with 14–18 dinner plates and the top rack was randomly loaded with several beakers and cups. Four new 10 ounce glass tumblers were placed randomly on the top racks as the test glasses. Soil used in the test was a mixture of 80 percent Parkay® Margarine and 20 percent Carnation® Non-fat Dry milk. The amount of soil used for each test was 40 grams for the first wash.

When a test was ready to be started, the desired amount of soil was smeared across the plates on the bottom rack, the detergent for the first cycle was placed in the detergent dispenser cup, and the machine was started. A normal cycle consisted of a wash, a rinse, a second wash, and two more rinses followed by a heat-drying cycle. At the beginning of the second wash, the machine was opened and a second detergent aliquot was added. Soil was not added when a second detergent dose was added. The detergent dosage for the 2 washes was 30 grams per wash and the concentration of detergent for each wash was 3000 ppm. The temperature of the supply water was maintained at 120° F. unless noted otherwise. Water with a measured hardness of 300 ppm and a Ca++ to Mg++ ratio of 3.5:1 was used as supply water unless noted otherwise. The machine was then allowed to complete the normal cycle including the drying time. This procedure was followed for a total of five complete cycles for each set of glasses.

When the final drying cycle was completed, the door was opened and the four glasses were removed and evaluated for filming and spotting. The test glasses were evaluated by placing them in light box equipped with a fluorescent light. The glasses were ranked according to the Film Rating System summarized in Table V. The the average rating for the four glasses is reported below in Table VI for polymers produced by the process of the present invention:

TABLE V

| FILMING RATING SYSTEM | |
|---|---|
| 0 | No film |
| 1 | Barely perceptible |
| 2 | Slight |
| 3 | Moderate |
| 4 | Heavy |

Detergent Compositions Tested (by weight solids)

20% sodium carbonate
12.5% sodium citrate.2$H_2O$
7.5% zeolite 4A
5% perborate.4$H_2O$
6% Britesil ® H20 Silicate ($SiO_2$:$Na_2O$ 2.0:1)
4% Olin Polytergent ® SLF-18 surfactant
3% amino acid polymer
diluted to 100% with sodium sulfate

TABLE VI

Performance of Amino Acid Polymers in Autodish Detergent Formulations

| Example | Composition of Reaction Mixture | Mw | Film |
|---|---|---|---|
| Comparative Example 25 | No Polymer | — | 4+ |
| Example 26 | 90 Asp/10 $H_3PO_4$ | 6,700 | 0 |
| Example 27 | 90 Asp/10 $H_3PO_4$ (hydrolyzed) | 8,200 | 0 |
| Example 28 | 50 Asp/5 $H_3PO_4$/45 $Na_2SO4$ (hydrolyzed) | 8,280 | 0 |
| Example 29 | 80 Asp/20 $H_3PO_4$ | 15,500 | 0 |
| Example 30 | 500 Asp/10 $H_3PO_4$/20 $NaHSO_4$/ 20 $Na_2SO4$ (hydrolyzed) | 23,200 | 0 |
| Example 31 | 62.5 Asp/9.4 $H_3PO_4$/2.5 $NaHSO_4$/25.6 $Na_2SO4$ (hydrolyzed) | 10,700 | 0 |

Key: for Table VI
Asp & by weight L-aspartic acid
$H_3PO_4$ % by weight percent orthophosphoric acid
$NaHSO_4$ % by weight sodium bisulfate
$Na_2SO4$ % by weight sodium sulfate The data in Table VI shows the effectiveness of the amino acid polymers produced by the process of the present invention in autodish detergent formulations. Examples 26, 27 and 29 in Table VI were prepared by the procedure in Example 4 except that the reaction mixture was formed according to the reaction mixture composition indicated in Table VI and the total reaction time was 6 hours instead of 5 hours. Examples 28, 30 and 31 were prepared by the procedure in Example 6 except that the reaction mixture was formed according to the compositions indicated in Table VI. Examples 27, 28, 30 and 31 were hydrolyzed according to the procedure described in Example 9.

Table VI indicates that the amino acid polymers produced by the process of the present invention are effective in the autodish detergents for preventing filming at a variety of molecular weights. Additionally, the hydrolyzed amino acid polymers perform comparably to the non-hydrolyzed amino acid polymers.

Performance of Amino Acid Polymers in Water Treatment Applications

The amino acid polymers made by the process of the present invention were evaluated for their ability in aqueous systems to disperse kaolin and iron oxide, and for their ability to inhibit the precipitation of calcium carbonate and calcium sulfate scale.

The polymers evaluated in these tests are described in Table VII below:

TABLE VII

Polymers Evaluated in Water Treatment Applications

| Polymer Tested | Composition | Mw |
|---|---|---|
| Comparative Polymer A | Acumer ® 1000[1] | — |
| Comparative Polymer B | poly(aspartic acid) | 4540 |
| Amino Acid Polymer C | poly(aspartic acid) | 7970 |
| Amino Acid Polymer D | poly(aspartic acid) | 16,300 |

[1]Registered Trademark of Rohm and Haas Company

Comparative Polymer B was made according to the process in Comparative Example 1 (no acid catalyst) and hydrolyzed according to the procedure in Example 9. Amino Acid Polymer D was made according to the procedure in Example 3 (20 weight percent orthophosphoric acid). Amino Acid Polymer C was also made according to the procedure in Example 3 except that 10 weight percent orthophosphoric acid was used instead of 20 weight percent (composition of the reaction mixture was 10 weight percent orthophosphoric acid and 90 weight percent aspartic acid). Additionally, Amino Acid Polymers C and D were washed with water to remove phosphorus containing species such as phosphoric acid and pyrophosphate, and were then hydrolyzed according to the procedure described in Example 9 to produce poly(aspartic acid).

Inhibition of the Precipitation of Calcium Carbonate

The following test method was used to measure the ability of the amino acid polymers to inhibit the precipitation of calcium carbonate. The following solutions were prepared:

| A. Stock Solution 1: | 2.14 grams $NaHCO_3$ |
| | 1.35 grams $Na_2CO_3$ |
| | Deionized Water |
| | (enough to make 2 liters of Stock Solution 1) |
| B. Stock Solution 2: | 3.74 grams $CaCl_2.2H_2O$ |
| | 1.53 grams $MgSO_4$ |
| | Deionized Water |
| | (enough to make 2 liters of Stock Solution 2) |
| | 5 drops 2 N HCl |
| | (added after the 2 liters of Stock Solution 2 is formed) |
| C. Polymer Sample Solution: | 0.1 weight percent active polymer to be tested |
| | Deionized Water (Balance) |
| | pH adjusted to 8 with 0.1 N and 0.5 N HCl (adjusted after forming the |

-continued

| Polymer Sample Solution) |
|---|

By "active" polymer, we mean that the weight percent polymer was calculated based on the polymer in its acid form (not neutralized form).

A Polymer Test Solution was prepared by adding to a four ounce jar, 50 ml of the Stock Solution 1, 0.7 ml of the Polymer Sample Solution, and 50 ml of the Stock Solution 2, in that order. The pH of the Polymer Test Solution was adjusted to a pH of 9 with 0.1N and 0.5N HCl. Also, prepared in four ounce jars were two control solutions of the following composition:

| No Polymer Solution (Control) | 50 ml Stock Solution 1<br>50 ml Stock Solution 2<br>pH adjusted to 9 with 0.1 N and 0.5 N HCl<br>(adjusted after mixing Stock Solution 1 and 2) |
|---|---|
| 100% Inhibited Solution: (Control) | 50 ml Stock Solution 2<br>50 ml Deionized Water |

The Polymer Test Solution was placed in a water bath at 54° C. for 20 hours and then filtered while warm through a 0.22 micron filter. The Polymer Test Solution was then cooled to room temperature.

To measure the inhibition of calcium carbonate precipitation, the filtered Polymer Test Solution, the No Polymer Solution, and the 100 Percent Inhibited Solution, were analyzed for divalent calcium ion using EDTA titration. The percent calcium carbonate precipitation inhibited was calculated as follows:

Percent $CaCO_3$ Inhibition =

$$\frac{100 \times (\text{ml } EDTA \text{ Polymer Test Solution} - \text{ml } EDTA \text{ No Polymer Solution})}{(\text{ml } EDTA \text{ 100\% Inhibited Solution} - \text{ml } EDTA \text{ No Polymer Solution})}$$

The performance of the amino acid polymers to inhibit the precipitation of calcium carbonate is shown in Table VIII below:

TABLE VIII

Performance of Amino Acid Polymers to Inhibit Precipitation of Calcium Carbonate

| Example | Polymer Tested | % $CaCO_3$ Inhibition (0.7 ppm active polymer) |
|---|---|---|
| Comparative Example 32 | No Polymer | 0.0 |
| Comparative Example 33 | Comparative Polymer A | 67.1 |
| Comparative Example 34 | Comparative Polymer B | 46.0 |
| Example 35 | Amino Acid Polymer C | 58.9 |
| Example 36 | Amino Acid Polymer D | 62.5 |

The results in Table VIII show that Amino Add Polymers C and D, made by the process of the present invention, are effective in inhibiting the precipitation of calcium carbonate when compared to the no polymer control. Additionally, Amino Acid Polymer C (poly(aspartic acid), Mw=7970) and Amino Acid Polymer D (poly(aspartic acid), Mw=16,300) inhibit calcium carbonate precipitation better than Comparative Polymer B (poly(aspartic acid), Mw=4450).

Inhibition of the Precipitation of Calcium Sulfate

The percent inhibition of calcium sulfate precipitation was measured using NACE Standard TM-03-74 test procedure. This test procedure is available from NACE (National Association of Corrosion Engineers), located in Houston Tex.

The performance of the amino acid polymers to inhibit the precipitation of calcium sulfate are shown below in Table IX. The polymers tested in Table IX, except for Amino Acid Polymer D, were evaluated twice for percent calcium sulfate inhibition and the values shown in Table IX are the average of the two tests. Amino Acid Polymer D was tested once.

TABLE IX

Performance of Amino Acid Polymers to Inhibit Precipitation of Calcium Sulfate

| | | % $CaSO_4$ Inhibition | |
|---|---|---|---|
| Example | Polymer Tested | 0.2 ppm active polymer | 0.5 ppm active polymer |
| Comparative Example 37 | No Polymer | 68.8 | 68.8 |
| Comparative Example 38 | Comparative Polymer A | 77.1 | 99.5 |
| Comparative Example 39 | Comparative Polymer B | 73.6 | 92.3 |
| Example 40 | Amino Acid Polymer C | 73.4 | 94.9 |
| Example 41 | Amino Acid Polymer D | 71.8 | 84.6 |

The results in Table IX show that the Amino Acid Polymers C and D, made by the process of the present invention, are effective in inhibiting the precipitation of calcium sulfate when compared to the no polymer control and Comparative Polymers A and B.

Kaolin Dispersancy

The following procedure was used for measuring the ability of the amino acid polymers produced by the process of the present invention to disperse Kaolin: In a multimix cup, a mixture was prepared consisting of 430 ml of water containing 200 ppm $CaCl_2$, as calcium carbonate, and 0.43 grams of hydrite UF Kaolin (1000 ppm kaolin). The mixture was mixed for 10 minutes and then the pH of the mixture was adjusted to 7.5 with sodium hydroxide. Aliquots of 100 ml of the pH adjusted mixture were placed in four ounce jars. To each four ounce jar was added a polymer sample solution to form a test mixture in an amount to provide a concentration of 5 ppm active polymer in the test mixture. The polymer sample solution consisted of 0.1 weight percent of active polymer to be tested in deionized water, and was adjusted to a pH of 8. The jars were capped and placed on a shaker for 15 minutes. After being shaken, the jars were allowed to stand undisturbed for 2 hours. After the 2 hours, the top 20 ml of each jar was placed in a one ounce vial. The turbidity of the solution in the vial was measured, in nephelometric turbidity units (NTU), using an HF model DRT 100D turbidimeter.

The performance of the amino acid polymers to disperse Kaolin are shown below in Table X. The polymers tested in Table X were evaluated twice for kaolin dispersancy and the values shown in Table X are the average of the two tests.

TABLE X

Performance of Amino Acid Polymers in Dispersing Kaolin

| Example | Polymer Tested | Kaolin Dispersancy (NTU) (5 ppm active polymer) |
|---|---|---|
| Comparative Example 42 | No Polymer | 21 |
| Comparative Example 43 | Comparative Polymer A | 116 |
| Comparative Example 44 | Comparative Polymer B | 118 |
| Example 45 | Amino Acid Polymer C | 116 |

The results in Table X show that the Amino Acid Polymer C, made by the process of the present invention, is effective in dispersing Kaolin when compared to the no polymer control and Comparative Polymers A and B.

Iron Oxide Dispersancy

The following procedure was used for measuring the ability of the amino acid polymers produced by the process of the present invention to disperse iron oxide: In a multimix cup, a mixture was prepared consisting of 430 ml of water containing 200 ppm $CaCl_2$, as calcium carbonate, and. 0.30 grams of $Fe_2O_3$ (700 ppm $Fe_2O_3$), a Fisher reagent. The mixture was mixed for 15 minutes and then the pH of the mixture was adjusted to a pH of 7.5 with sodium hydroxide. Aliquots of 100 ml of the pH adjusted mixture were placed in four ounce jars. To each four ounce jar was added a polymer sample solution to form a test mixture in an amount to provide concentrations of 3 and 6 ppm active polymer in the test mixture. The polymer sample solution consisted of 0.1 weight percent of active polymer to be tested in deionized water, and was adjusted to a pH of 8. The jars were capped and placed on a shaker for 15 minutes. After being shaken, the jars were allowed to stand undisturbed for 4 hours. After the 4 hours, the top 20 ml of each jar was removed and placed in a one ounce vial. The turbidity of the solution in the vial was measured using an HF model DRT 100D turbidimeter.

The performance of the amino acid polymers to disperse iron oxide are shown below in Table XI. The polymers tested in Table XI were evaluated twice for iron oxide dispersancy and the values shown in Table XI are the average of the two tests.

TABLE XI

Performance of Amino Acid Polymers in Dispersing Iron Oxide

| Example | Polymer Tested | Iron Oxide Dispersancy (NTU) | |
|---|---|---|---|
| | | 2 ppm polymer | 6 ppm polymer |
| Comparative Example 46 | Comparative Polymer A | 57 | 50 |
| Comparative Example 47 | Comparative Polymer B | 55 | 62 |
| Example 48 | Amino Acid Polymer C | 54 | 68 |
| Example 49 | Amino Acid Polymer D | 66 | 65 |

The results in Table XI show that Amino Acid Polymers C and D, made by the process of the present invention, are effective in dispersing iron oxide when compared to Comparative Polymers A and B.

We claim:

1. A method of inhibiting scale formation during oil production by adding at least one amino acid polymer at a level of 0.1 to 3000 ppm; wherein the amino acid polymer is prepared by a process comprising:
   a) forming a reaction mixture of from about 15 to about 95 percent by weight amino acid, from about 3 to about 85 percent by weight of acid catalyst, and 0 to about 50 percent by weight of a polyfunctional monomer, wherein the weight percentages are based on the total weight of the reaction mixture;
   b) heating said reaction mixture from about 110° C. to about 300° C., while maintaining said reaction mixture as an intimate admixture by; i) adding one or more processing aid to the reaction mixture; ii) using mechanical means; or iii) a combination thereof;
   c) removing water from said reaction mixture; and
   d) recovering amino acid polymer.

2. A composition useful in oil production comprising at least one amino acid polymer and an inert diluent wherein the total amount of amino acid polymer is present at a level of from 20 to 60 percent by weight based on the total weight of the composition; and wherein the amino acid polymer is prepared by a process comprising:
   a) forming a reaction mixture of from about 15 to about 95 percent by weight amino acid, from about 3 to about 85 percent by weight of acid catalyst, and 0 to about 50 percent by weight of a polyfunctional monomer, wherein the weight percentages are based on the total weight of the reaction mixture;
   b) heating said reaction mixture from about 110° C. to about 300° C., while maintaining said reaction mixture as an intimate admixture by; i) adding one or more processing aid to the reaction mixture; ii) using mechanical means; or iii) a combination thereof;
   c) removing water from said reaction mixture; and
   d) recovering the amino acid polymer.

3. A method inhibiting scale formation during oil production using the composition of claim 2.

* * * * *